US009477692B2

(12) United States Patent
Beresniewicz et al.

(10) Patent No.: US 9,477,692 B2
(45) Date of Patent: Oct. 25, 2016

(54) SYSTEMS AND METHODS FOR APPLYING AN ANALYTICAL MODEL TO PERFORMANCE ANALYSIS

(71) Applicant: Oracle International Corporation, Redwood City, CA (US)

(72) Inventors: John Beresniewicz, Half Moon Bay, CA (US); Stephen Wexler, San Francisco, CA (US); Peter Belknap, San Mateo, CA (US); Hsiao-Te Su, Palo Alto, CA (US); Ameet Kini, Herndon, VA (US)

( * ) Notice: Subject to any disclaimer, the term of this patent is extended or adjusted under 35 U.S.C. 154(b) by 508 days.

(21) Appl. No.: 13/756,154

(22) Filed: Jan. 31, 2013

(65) Prior Publication Data
US 2014/0095428 A1 Apr. 3, 2014

Related U.S. Application Data

(60) Provisional application No. 61/708,459, filed on Oct. 1, 2012.

(51) Int. Cl.
*G06F 17/30* (2006.01)
*G06F 11/32* (2006.01)

(52) U.S. Cl.
CPC ....... *G06F 17/30289* (2013.01); *G06F 11/321* (2013.01); *G06F 17/30306* (2013.01); *G06F 2201/80* (2013.01)

(58) Field of Classification Search
CPC ................ G06F 17/30289; G06F 17/30306
USPC ......................................... 707/609
See application file for complete search history.

(56) References Cited

U.S. PATENT DOCUMENTS

| | | | |
|---|---|---|---|
| 2002/0175934 A1* | 11/2002 | Hand et al. | 345/734 |
| 2005/0055383 A1* | 3/2005 | Dias et al. | 707/202 |
| 2005/0055673 A1* | 3/2005 | Dias et al. | 717/127 |
| 2005/0086246 A1* | 4/2005 | Wood et al. | 707/101 |
| 2005/0216490 A1* | 9/2005 | Dias et al. | 707/100 |
| 2006/0059205 A1* | 3/2006 | Shah et al. | 707/200 |
| 2010/0036810 A1* | 2/2010 | Wu et al. | 707/3 |
| 2013/0097119 A1* | 4/2013 | Zeng | 707/640 |
| 2014/0143532 A1* | 5/2014 | Smith et al. | 713/100 |

* cited by examiner

*Primary Examiner* — Joshua Bullock
(74) *Attorney, Agent, or Firm* — Precision IP

(57) ABSTRACT

Aspects of the present disclosure describe systems and methods for providing active session history data to users for use in database performance analysis. In various aspects, active session history data obtained from monitoring a database and/or database system over a period of time may be segmented into multiple dimensions. The segmented data may be subsequently provide and/or displayed on one or more interfaces, such as a graphical user interface, to users. The interface may visualize the dimensional ASH data in a variety of ways, such as through icons, graphs, charts, histograms, temporal delineations, treemaps, etc.

20 Claims, 6 Drawing Sheets

SYSTEMS AND METHODS FOR APPLYING AN ANALYTICAL MODEL TO PERFORMANCE ANALYSIS

RELATED APPLICATIONS

The present non-provisional utility application claims priority under 35 U.S.C. 119(e) to provisional application No. 61/708,459 titled "Systems And Methods For Applying An Analytical Model To Performance Analysis," filed on Oct. 1, 2012, and which is hereby incorporated by reference herein.

TECHNICAL FIELD

Aspects of the present disclosure relate to database management, and in particular, systems and methods for monitoring databases and/or database systems.

BACKGROUND

A database represents an organized collection of data that is stored in a memory. Many enterprises, such as a business or governmental entity, use databases to store and manage data that is critical to their business operations. For example, a business may use a database to store all of the business's customer data, such as a customer's name and address.

Database management involves the administration, monitoring, and maintenance of the databases and/or database systems within the enterprise. Typically, a database management system (DBMS) is used to monitor and maintain a database or set of databases within a given enterprise. The ability to effectively monitor databases represents a critical aspect of database management, as monitoring provides users, such as database administrators, the ability to view and validate the integrity and health of a database. For example, a DBMS may be used to monitor performance characteristics, which subsequently may be analyzed to identify potential performance problems and/or abnormal conditions, usage trends, etc., of the database. In one specific example, various wait events of a database may be monitored in an attempt to identify any potential concurrency issues impacting performance. Conventional database management systems provide the monitored data in a static, inflexible display such as a static graph or chart, allowing for only limited analysis by users.

It is with these concepts in mind, among others, that aspects of the present disclosure were conceived and developed.

SUMMARY

Aspects of the present disclosure include methods for providing analytics. The method includes capturing, using at least one processor, one or more samples according to a pre-defined time period, the one or more samples including a plurality of active sessions within a database. The method further includes segmenting, using the at least one processor, at least one active session of the plurality of active sessions into a plurality of dimensions characterizing at least one request performed on the database.

Aspects of the present disclosure include systems for providing analytics. The system includes a database and at least one processor in operable communication with the database. The at least one processor is configured to capture one or more samples according to a pre-defined time period, the one or more samples including a plurality of active sessions within a database. The at least one processor is further configured to segment at least one active session of the plurality of active sessions into a plurality of dimensions characterizing at least one request performed on the database.

Aspects of the present disclosure include non-transitory computer readable mediums encoded with a services application comprising instructions executable by a processor. The instructions include capturing one or more samples according to a pre-defined time period, the one or more samples including a plurality of active sessions within a database. The instructions also include segmenting at least one active session of the plurality of active sessions into a plurality of dimensions characterizing at least one request performed on the database.

BRIEF DESCRIPTION OF THE FIGURES

Aspects of the present disclosure may be better understood and its numerous objects, features, and advantages made apparent to those skilled in the art by referencing the accompanying drawings. It should be understood that these drawings depict only typical embodiments of the present disclosure and, therefore, are not to be considered limiting in scope.

DETAILED DESCRIPTION

Aspects of the present disclosure describe systems and methods for providing active session history ("ASH") analytical data to users for use in database performance analysis. An ASH system involves a mechanism for sampling the state of active sessions connected to a database for a particular period of time. ASH analytical data may include an in-memory and on-disk record of time-sampled active sessions executing within a database. In various aspects, ASH data corresponding to the active sessions may be divided into one or more dimensions and provided or otherwise displayed to a user via an interactive interface, such as a graphical user interface ("GUI"). The GUI may present such data to the user in a variety of ways including icons, graphs, charts, treemaps, and histograms.

Aspects of the present disclosure enable the use of ASH data to enhance a user's ability to identify and diagnose database performance issues. More particularly, ASH data may be used in conjunction with various analytical tools, database monitoring systems, etc., to allow users to visualize various multidimensional aspects of the ASH data. For example, the system may use ASH data to generate a layered graph of active sessions using various dimensions (e.g., event, activity class, module/action, session, instance id, PL/SQL function, etc.). The system may further allow the user to parse and otherwise organize the data into specific aspects of a dimension (vertical zooming), and/or zoom in and out of any time period (horizontal zooming), such as months, days, hours, minutes, seconds, or any other temporal delineation.

Aspects of the present disclosure allow the various dimensions of ASH data to be quantified according to database time. A user may select to visualize a particular dimension of AH data. In response, an estimation of the amount of time spent in the database corresponding to the dimension may be provided to the user, effectively providing an indication of the particular dimension's impact on database performance.

Figure 1:
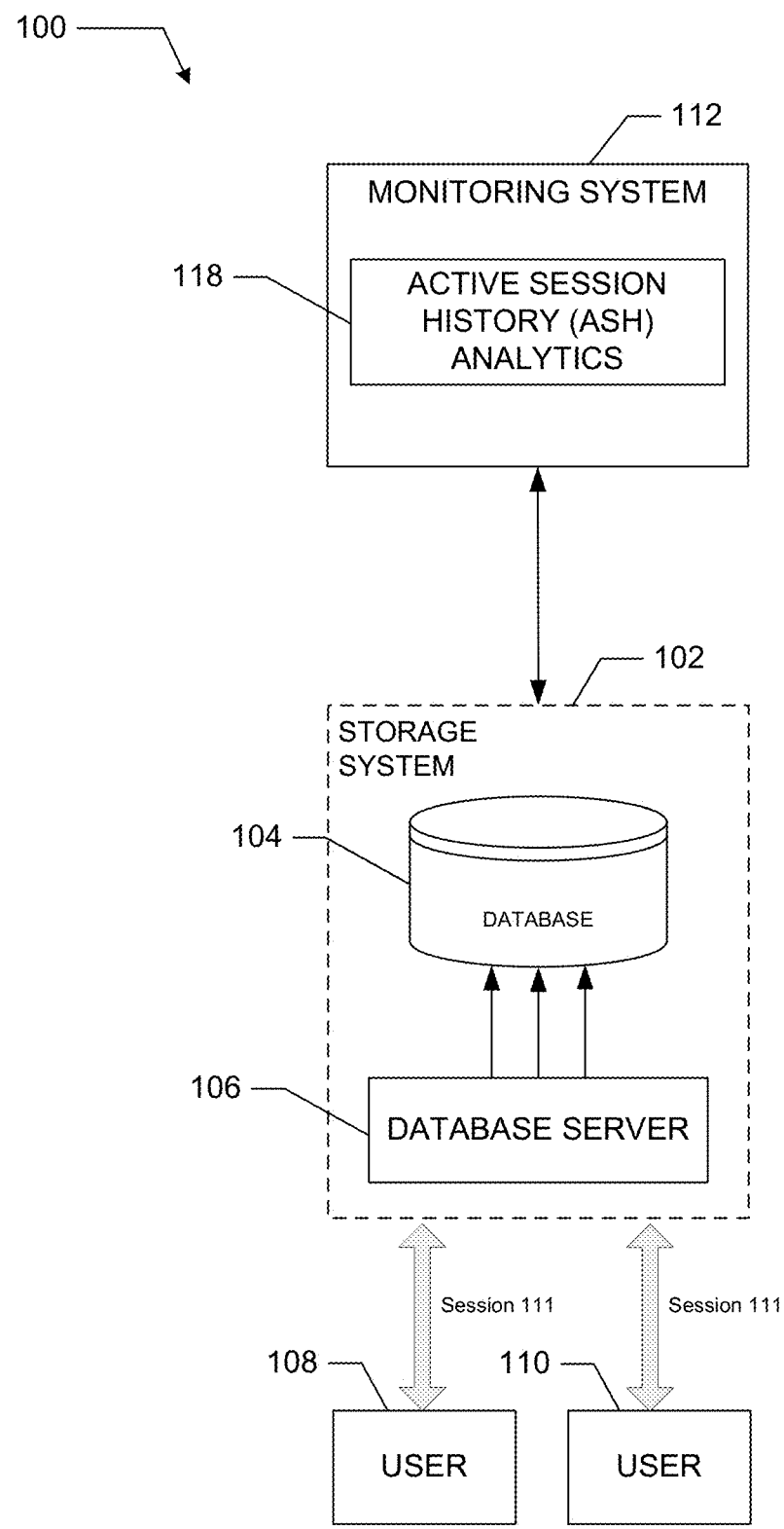
FIG. 1 is an example computing environment for monitoring databases, in accordance with one aspect of the present disclosure.

FIG. 1 illustrates an example computing environment 100 for using an ASH system and ASH data to diagnose and/or otherwise identify performance issues in a database, data store and/or other type of storage system. The computing environment 100 includes a storage system 102 including a database 104 and a database server 106, which may be a computer program, application, process and/or executable instruction(s) that provide database services to other computer components/resources, such as the database 104. The database 104 may be any type of database, such as a hierarchical database or network database, and in one particular embodiment, may be a relational database. A relational database represents a collection of data items organized in a relational model, typically involving a set of formally described tables. Typical relational database operations include: select, find, delete, join, intersect, except, difference, and the like.

The computing environment 100 includes user devices (108, 110) for transmitting requests to or otherwise engaging in sessions with the database server 106 to perform various operations in the database 104 of the storage system 102. Each user device may be a personal computer, work station, server, mobile device, mobile phone, tablet device, processor, and/or other processing device capable of implementing and/or executing server processes, software, applications, etc. Additionally, each device may include one or more processors that process software or other machine-readable instructions and may include a memory to store the software or other machine-readable instructions and data. Each user device (108, 110) may also include a communication system to communicate with the various components of the storage system 102 via a wireline and/or wireless communications, such as through the Internet, an intranet, an Ethernet network, a wireline network, a wireless network, a mobile communications network, and/or another communication network.

Each user device may also display a user-interface (UI) (not shown) for a user to interact with the database 104 and a display (not shown) such as a computer monitor, liquid crystal display, for viewing data and/or input forms, and any combination of input/output devices (not shown), such as a keyboard, or a pointing device (e.g., a mouse, trackball, pen, or touch pad), speaker, and/or any other type of device for receiving input. For example, by way of the UI, a user connect to the database 104 via the database server 106 and submit various requests and/or questions commonly referred to as "queries" to access data within the database 104. For example, a user may transmit a query requesting access to read data in the database 104, write data to the database 104, modify data within the database 104, and/or delete data in the database 104. Other queries or requests may also be transmitted. Applications running on the user device also may query the database.

Each time a user connects to the database 104, a database session 111 is generated. For example, if a user "user1" submitted a query requesting to read data stored in the database 104 and a user "user2" submitted a query requesting write access to data within the database 104, two sessions would be generated: a first session connecting user1 to the database 104 and a second session connecting user2 to the database 104 via the database server 106. Any session generated corresponding to a user request is referred to a "foreground" request. Thus, both of the sessions generated for user1 and user2 are foreground requests. In contrast, a "background" session is any session acting in the database that corresponds to maintenance of the database, such as activities for managing shared memory within the database, activities relating to managing concurrent access to data within the database 104, etc.

A session may be considered active or idle. An "active" session represents a session that currently includes some event or interaction with the database 104, such as executing a query and/or waiting for a response from the database 104 once a query has been executed or otherwise initiated. Stated differently, an active session is a session that is either actively using a CPU to process a database request or actively waiting for a resource while a database process is ongoing. In contrast, an idle session represents any session that is not currently interacting with the database in any manner, such as when a user connects to the database 104 but has not requested the execution of any queries or when a query has finished executing and received a response. Thus, referring to the user1 and user2 example above, when user1 issues a read request to the the database server 106, the session corresponding to user1 is considered active. Similarly, while user1's request is waiting on a response to the read request from the database 104 and database server 106, user1's session is still considered active. When user2 issues a write request to the database server 106, the session corresponding to user2 is considered active. Subsequently, when the user2 request is waiting on a response to the write request from the database 104 and database server 106, user2's session remains active. The sessions corresponding to user1 and user2 will be considered idle when respective read and write requests have been completed.

Referring again to FIG. 1, a monitoring system 112 may monitor various aspects of the database 104, and in particular, provide an analysis of the various operations and/or queries that are performed on or by the database 104 during a particular period of time to identify potential performance issues. For example, the monitoring system 112 may monitor query requests of various applications that attempt to access the database 104. As another example, the monitoring system 112 may monitor query requests transmitted from the user devices (108, 110) to the database server 106 for any database operations to be performed in the database 104. It is contemplated that the monitoring system 112 may monitor any type of operation that may be performed on the database 104.

In one particular embodiment, the monitoring system 112 may generate or otherwise provide data, aggregations, and/or statistics that measure the time spent in the database based on a metric referred to as DB time. DB time quantifies the time spent in the database 104, and further quantifies the total aggregate impact of active sessions within the database 104. A commonly used system for monitoring various aspects of a database and generating DB time statistics is the Oracle® Automatic Database Diagnostic Monitor™ ("ADDM") system. The ADDM automatically detects and reports performance problems for a monitored database and provides the results to users in the form of one or more ADDM findings. In particular, the ADDM examines and analyzes data captured in an automatic workload repository (AWR) to determine possible performance problems in the database. The ADDM then locates the root causes of the performance problems, provides recommendations for correcting such problems, and quantifies the expected benefits according to DB time. Accordingly, in one particular embodiment, the monitoring system 112 may be an ADDM configured to monitor various aspects and/or operations of the database 104. In such an embodiment, the ADDM may be used to perform a holistic analysis of the various operations that were performed in database 104.

The various monitoring tools, analytics, etc., provided by the monitoring system 112 may be extended by and/or integrated with ASH analytics 118 to diagnosis database performance issues. In particular, various instructions, applications, processes and/or functions of the ASH analytics 118 may be executed by and/or within the monitoring system 112 to capture and analyze time-sampled data (referred to herein as "samples") for active sessions of the database 104. Subsequently, the samples may be added to or recorded in an active session history that may be processed to generate various statistics, perform various analyses, etc., all of which may be used to identify potential problems within the storage system 102 (samples, active session history, and active sessions may be included in the collective ASH data). More particularly, the active session data entries stored within each sample included within the active session history may be segmented into one or more dimensions. Subsequently, the dimensions may be presented via one or more user interfaces to users. The users may interact with the various dimensions presented in the user interfaces to determine identify, and/or quantify how each particular dimension may be affecting database performance.

Figure 2:
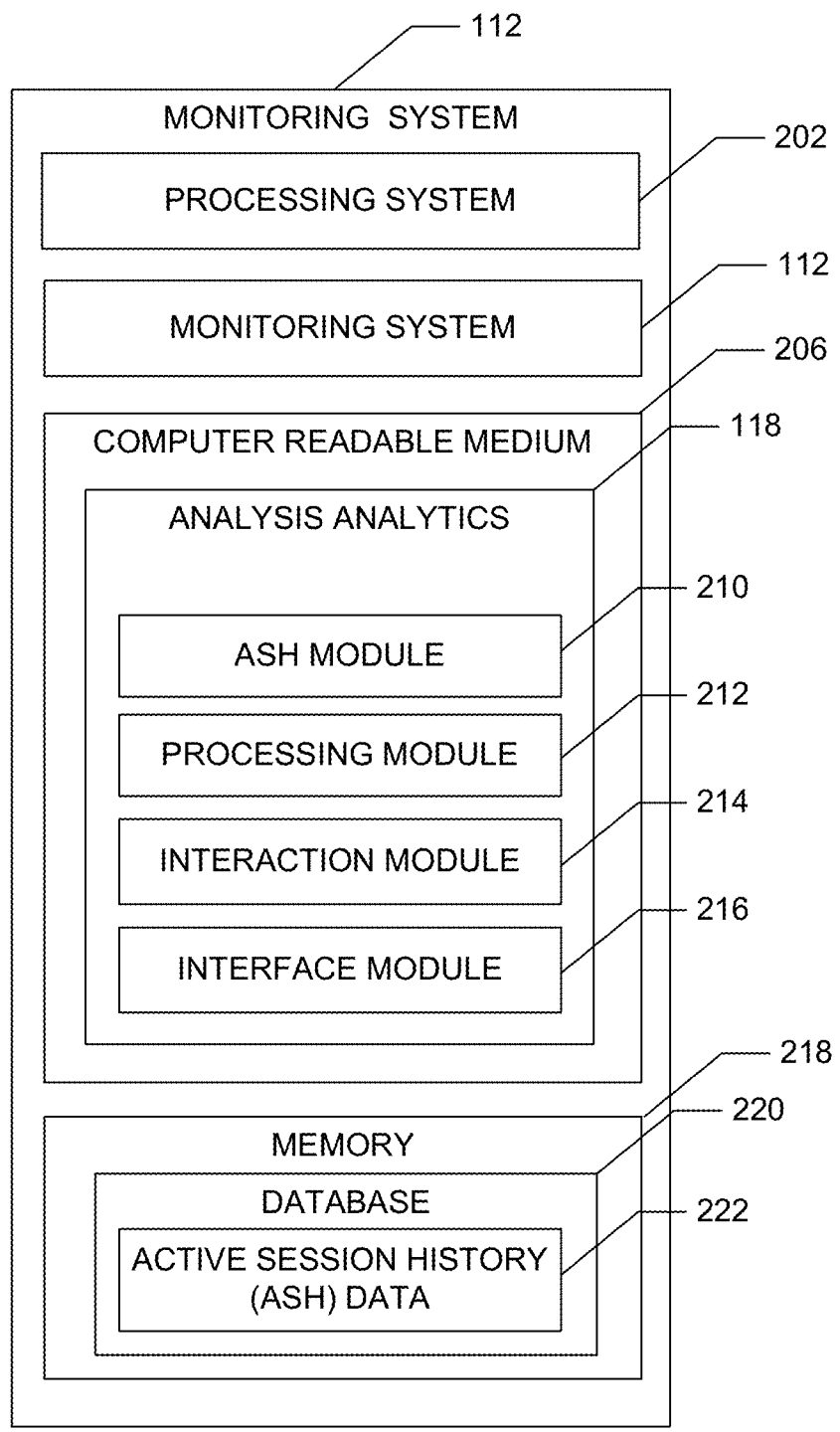
FIG. 2 is a block diagram of an analysis system in accordance with one aspect of the present disclosure.

FIG. 2 is a block diagram illustrating the monitoring system 112 according to aspects of the present disclosure. The monitoring system 112 includes a processing system 202 that may be used to execute the ASH analytics 118 for use in database performance analysis. The processing system 202 may be in communication with a memory 218. The memory 218 may include volatile and/or non-volatile memory, and may provide a database 220, which may be a general repository of data including, but not limited to, ASH data 222 and/or any other data related to monitoring a database and/or database system.

The monitoring system 112 may include a computer readable medium ("CRM") 206, which may include computer storage media, communication media, and/or another available computer readable medium that may store executable instructions to implement the analysis application 118 and/or associated functions, processes, etc. CRM 206 may include non-transient computer storage media and communication media. By way of example and not limitation, computer storage media includes memory, volatile media, non-volatile media, removable media, and/or non-removable media implemented in a method or technology for storage of information, such as machine/computer-readable/executable instructions, data structures, program modules, or other data. Communication media includes machine/computer-readable/executable instructions, data structures, program modules, or other data. Generally, program modules include routines, programs, instructions, objects, components, data structures, etc., that perform particular tasks or implement particular abstract data types. For example, as illustrated, CRM 206 may include or otherwise store an ASH module 210, a processing module 212, an interaction module 214, and an interface module 216 of the analysis ASH Analytics 118. Other modules may also be included.

Figure 3:
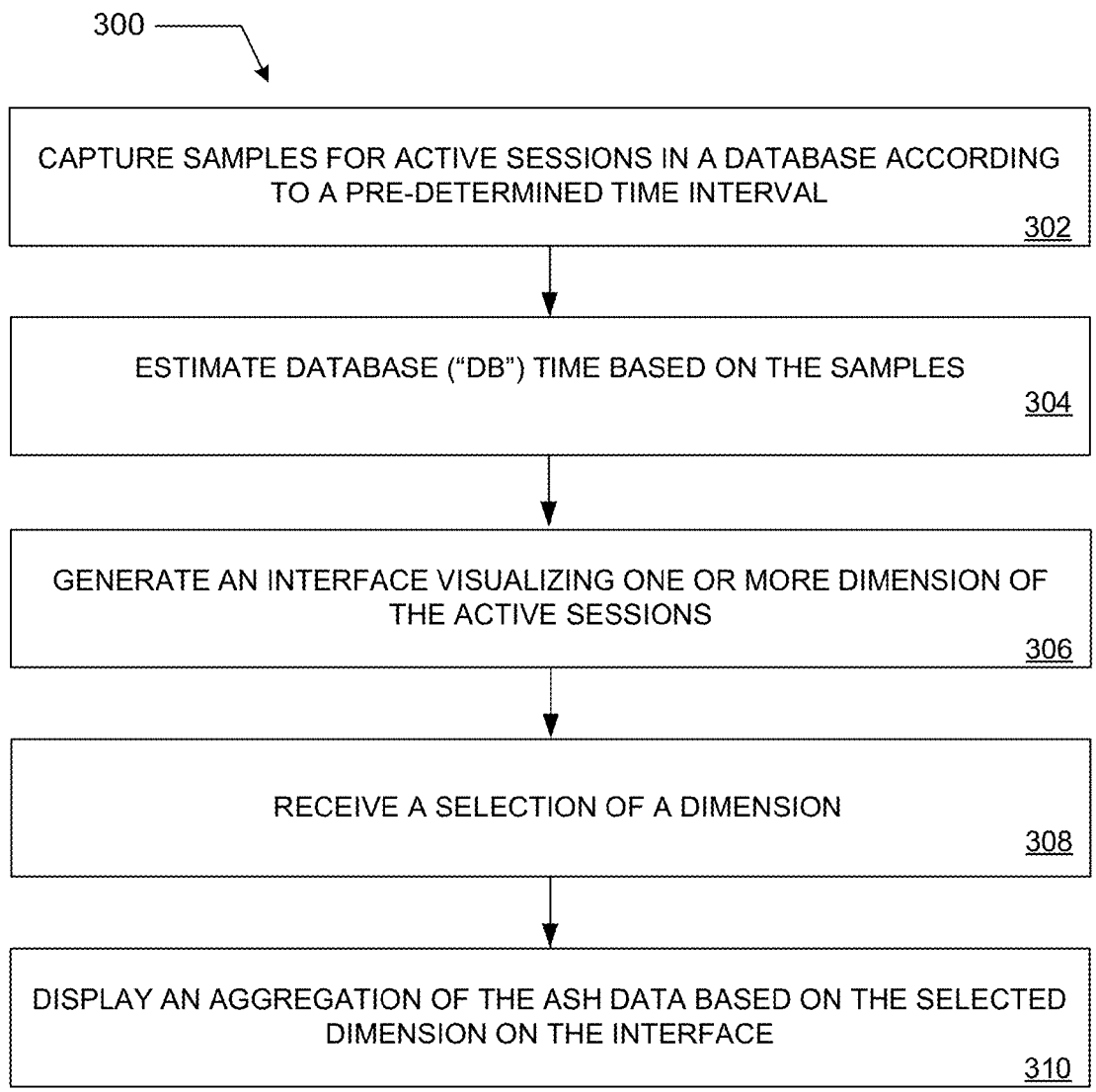
FIG. 3 is an example process for monitoring a database in accordance with one aspect of the present disclosure.

Referring now to the method depicted in FIG. 3, as well as FIGS. 1-2 and 4-6, in one particular embodiment, the monitoring system 112 may launch, run, execute, interpret, or otherwise perform the logical instructions and/or processes of the ASH analytics system 118. In one specific example, the ASH analytics system may implement and run the process 300 shown in FIG. 3, which depicts an example method and/or process for defining and/or generating one or more interactive user interfaces that display and/or provide ASH data corresponding to the database 104 to users for analysis.

Process 300 begins with capturing samples of active sessions of a database based on a pre-determined time interval (operation 302). As illustrated in FIG. 2, the ASH module 210 may capture or otherwise identify active sessions in the database 104 currently executing one or more activities, operations, queries, and/or requests performed on the database 104, or waiting for response from such activities, operations, queries or requests. In particular, the ASH module 210 may analyze each session of the database 104 and determine whether the session is an active session and therefore contributing to DB time. If a session is active, the ASH module 210 may add an entry into an active session history for the session.

The ASH module 210 may capture the active sessions in the form of "samples" at uniform time intervals based on a pre-defined sampling frequency. The captured samples may be recorded as a sequence of snapshots of information for activities performed in database 104 over time. For example, in one embodiment, the pre-defined sampling frequency may be one sampling per second. Thus, each captured sample represents 1 second of activity for active sessions within the database 104.

An illustrative example for capturing samples according to a uniform time-interval will now be provided. Assume five database sessions currently exist within the database 104. Four of the sessions correspond to individual users queries (foreground sessions) and one corresponds to a background session. Initially, during a first second of the four foreground sessions, three are currently active (sessions 1, 2, and 3) and one is idle (session 4). Of the three active foreground sessions, one is waiting on a response to a read request (session 1) and the other two sessions (sessions 2 and 3) correspond to write requests currently being executed within the database 104. After two seconds pass, only session 3 remains active, as it is still waiting on a response to its read request. Finally, after three seconds have passed, no active sessions remain; all have been executed and received responses from the database 104.

Figure 4:
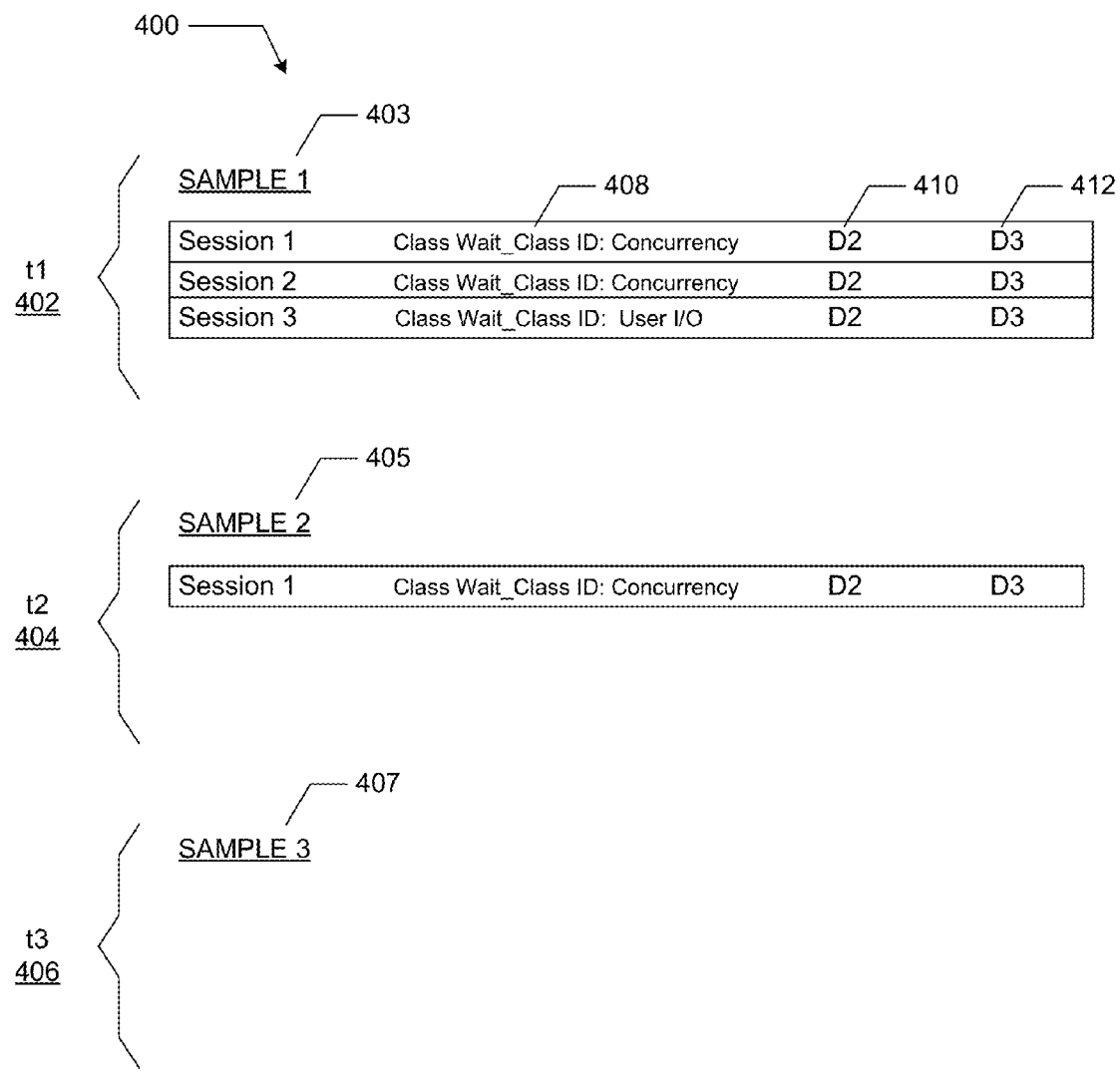
FIG. 4 is a diagram illustrating samples in accordance with one aspect of the present disclosure.

Accordingly, as shown in FIG. 4, three samplings are captured by the ASH module 210 at sampling times $t_1$ 402, $t_2$ 404, and $t_3$ 406 based on a pre-defined time interval and sampling frequency of one sample per second. Of the five sessions within the database, only three samples were taken for the three active foreground sessions. Background sessions and idle sessions are not included in DB time and therefore were not included in the sample. In particular, at time $t_1$, three samples are captured (one for each active session 1, 2, and 3). At sample time $t_2$, because active sessions 1 and 2 are not involved in activities at sample time $t_2$, only one sample is captured for active session 1. At sample time $t_3$, because all of the active sessions are not involved in activities at sampling time $t_3$, no samples are captured. The captured samples may be added to an active session history and stored in the database 220.

Each record corresponding to an active session included within a sample may be broken into one or more dimensions. A dimension represents a data element and/or characteristic that may be used to categorize or characterize various aspects of an active session. Stated differently, dimensions provide a means to divide, segment, and/or reduce the session data into meaningful portions of sub data that may be used, for example by users, to parse, process, filter, group, label and/or analyze ASH data, all of which may be used to further identify database performance corresponding to the database 104. Thus, dimensions represent key variables which could play roles in database performance. Dimensions act as entry points to check database performance symptoms. For example, as illustrated in FIG. 4, Session 1 includes dimensions 408-412. Dimension 408 represents the wait class dimension and may contain a value corresponding to a specific wait event and/or wait class such as a concurrency wait class event as shown. The following Table 1 illustrates an example list of the various dimensions that may be associated with and or otherwise determined from active session data of a sample:

TABLE 1

List Of Session Dimensions

| Dimension Name | Columns In Active Session History Data |
| --- | --- |
| OPERATION | Time Model Bits (the IN_* columns) and TOP_LEVEL_CALL_NAME |
| SQL_OPCODE_TOP | TOP_LEVEL_SQL_OPCODE |
| SQL_OPCODE | SQL_OPCODE |
| PLSQL_TOP | PLSQL_ENTRY_OBJECT_ID, PLSQL_ENTRY_SUBPROGRAM_ID |
| PLSQL | PLSQL_OBJECT_ID, PLSQL_SUBPROGRAM_ID |
| SQL_ID_TOP | TOP_LEVEL_SQL_ID |
| SQL_ID | SQL_ID |
| SQL_FORCE_MATCHING_SIGNATURE | FORCE_MATCHING_SIGNATURE |
| SQL_PLAN_HASH_VALUE | SQL_PLAN_HASH_VALUE |
| SQL_ROWSOURCE | SQL_PLAN_OPERATION, SQL_PLAN_OPTIONS |
| SQL_ROWSOURCE_LINE | SQL_PLAN_LINE_ID, SQL_PLAN_OPERATION, SQL_PLAN_OPTIONS |
| CLASS | WAIT_CLASS_ID |
| EVENT | EVENT_ID |
| BLOCKER | BLOCKING_INST_ID, BLOCKING_SESSION, BLOCKING_SESSION_SERIAL# |
| RESOURCE | Function of P1, P2, P3, CURRENT_FILE#, CURRENT_BLOCK#, CURRENT_OBJ#, and REMOTE_INSTANCE# |
| INSTANCE | INST_ID |
| USER_SESSION | QC_INSTANCE_ID, QC_SESSION_ID, QC_SESSION_SERIAL# SESSION_ID#, SESSION_SERIAL# |

The various dimensions of a session may be organized in a hierarchy. The hierarchy involves nodes and edges connecting the nodes. Nodes represent logical dimensions, which are groups of columns in the ASH, and edges represent navigation paths to aid users in exploring ASH data.

Referring again to FIG. 3, once one or more samples have been recorded or otherwise entered into the active session history, the active session history is used to estimate DB time (operation 304). In particular, each session within each sample recorded in the active session history is equated to some unit of time, such as one second, one minute, and or any other uniform temporal delineation of time. FIG. 4 is an example illustration of an active session history 400 that includes one or more samples t1 402, t2 404, and t3 406. As illustrated, each row within each sample (t1 402, t2 404, t3 406) may be equated to one second of time. Thus, Session 1, 2, and 3 within Sample 1 403 would be equivalent to 3 seconds of DB time. Session 1 within Sample 2 405 would be equivalent to 1 second of DB time. No DB time would be counted for Sample 3 407 because no sessions were recorded during t3 406. Thus, the total aggregate DB time of the active session history 400 would be equivalent to 4 seconds. If each row within each sample (t1 402, t2 404, t3 406) were equated to 1 minute of time, the DB time of the active session history 400 would be equivalent to 4 minutes.

Next, one or more interactive interfaces may be generated visualizing one or more dimensions of the active sessions captured within each sample (operation 306). As shown in FIG. 2, a processing module 212 may generate one or more interactive, and/or guided GUIs for display at one or more user devices (108,110) that allow users to visualize the various dimensions and each dimensions corresponding cost with respect to DB time. In one particular embodiment, an application programming interface ("API") may be generated that returns ASH data in an extensible markup language ("XML") format segmented by dimension. An API represents a specification intended to be used as an interface by software components to communicate with each other. XML represents a markup language that defines a set of rules for encoding documents in a standard user-defined machine-readable form. Accordingly, the API generated by the processing module 212 may be generated to expose ASH data corresponding to the active session history in an XML format.

An interface module 214 may transmit instructions that may be processed and/or executed to display the one or more interactive interfaces generated by the processing module 212 that allow users to visualize and/or select the various dimensions of ASH data. In particular, the interactive user interfaces may include various interactive components, such as buttons, forms, fields, selections, inputs, streams, graphs, trees, selections, etc., to display, provide, or otherwise visualize ASH data and any dimensions of the ASH data. In response, a user, such as a database administrator, may interact with the various components of the user interfaces to select one or more dimensions.

Figure 5:
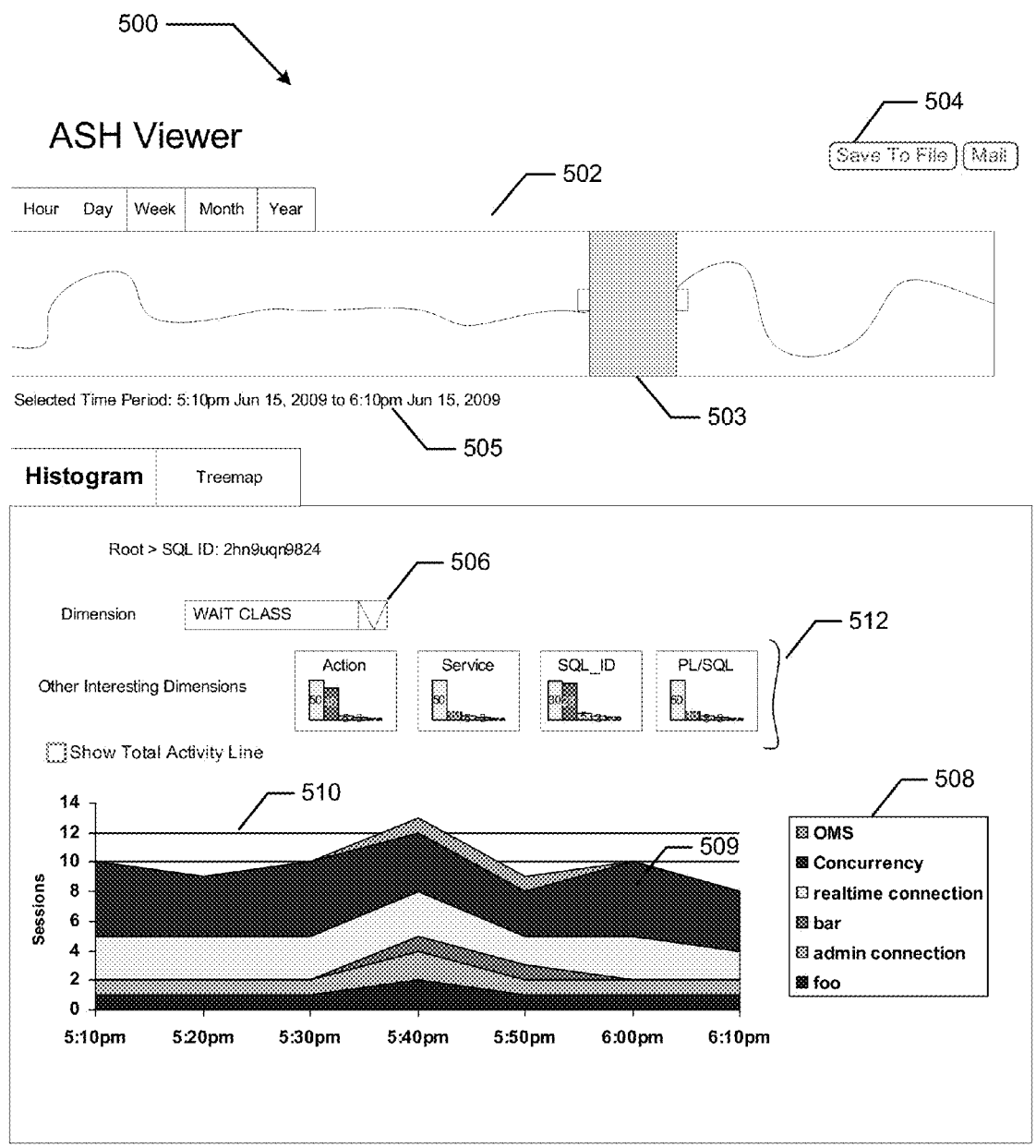
FIG. 5 is an example interface in accordance with one aspect of the present disclosure.

As illustrated in FIG. 5, the interface module may generate a histogram interface, such as interface 500 that may include various components for visualizing and/or selecting ASH data and ASH data dimensions. As illustrated, the interface 500 may include a time period selection component 502 representing a mechanism for selecting a time period that temporally quantifies the time over which ASH data may be presented or otherwise displayed. The time period selection component 502 is implemented as a movable slide bar 503 capable of being manipulated by a user to select the desired time period. The slide bar may be manipulated in reference to a finite time period 505 that articulates the entire time period for which active session data was stored (i.e. samples were captured and stored in the active session history).

The histogram interface 500 may also include a save component 504 that allows ASH data to be saved so the user can later view it within an active report. An active report allows users to view ASH data offline in a record, report, file, message, etc. The histogram interface 500 may include a "Dimension" component 506, which, for example, may be a dropdown menu that allows a user to select any logical dimension from ASH data. The histogram interface 500 may also include a filtering component 508 (i.e., the legend) that allows a user to select a filter that may be used to filter the ASH data. For example, clicking on a particular portion of the "Sessions" graph 510 and/or or a specific element in the filtering component 508 (e.g., selecting a specific element in the legend) will filter the chart data such that only the selected aspects of ASH data is displayed. For instance, when the band for "Concurrency" 509 in the Sessions chart is selected by a user the user, the chart data will be filtered such that only the "Concurrency" band is displayed and the others are eliminated, i.e., filtered out of the display. This allows users to isolate and focus on the specific dimension of interest, in this example the "Concurrency" dimension.

The histogram interface 500 may include an "Other Interesting Dimensions" component 512, which allows interactions on the histogram interface 500 to be guided for a user. For example, the histogram interface 500 may automatically provide and/or otherwise display selected dimensions of ASH data dynamically, such as for example, displaying which dimensions have already been selected or viewed by users, possible suggestions on what dimensions should be analyzed next, etc.

Figure 6:
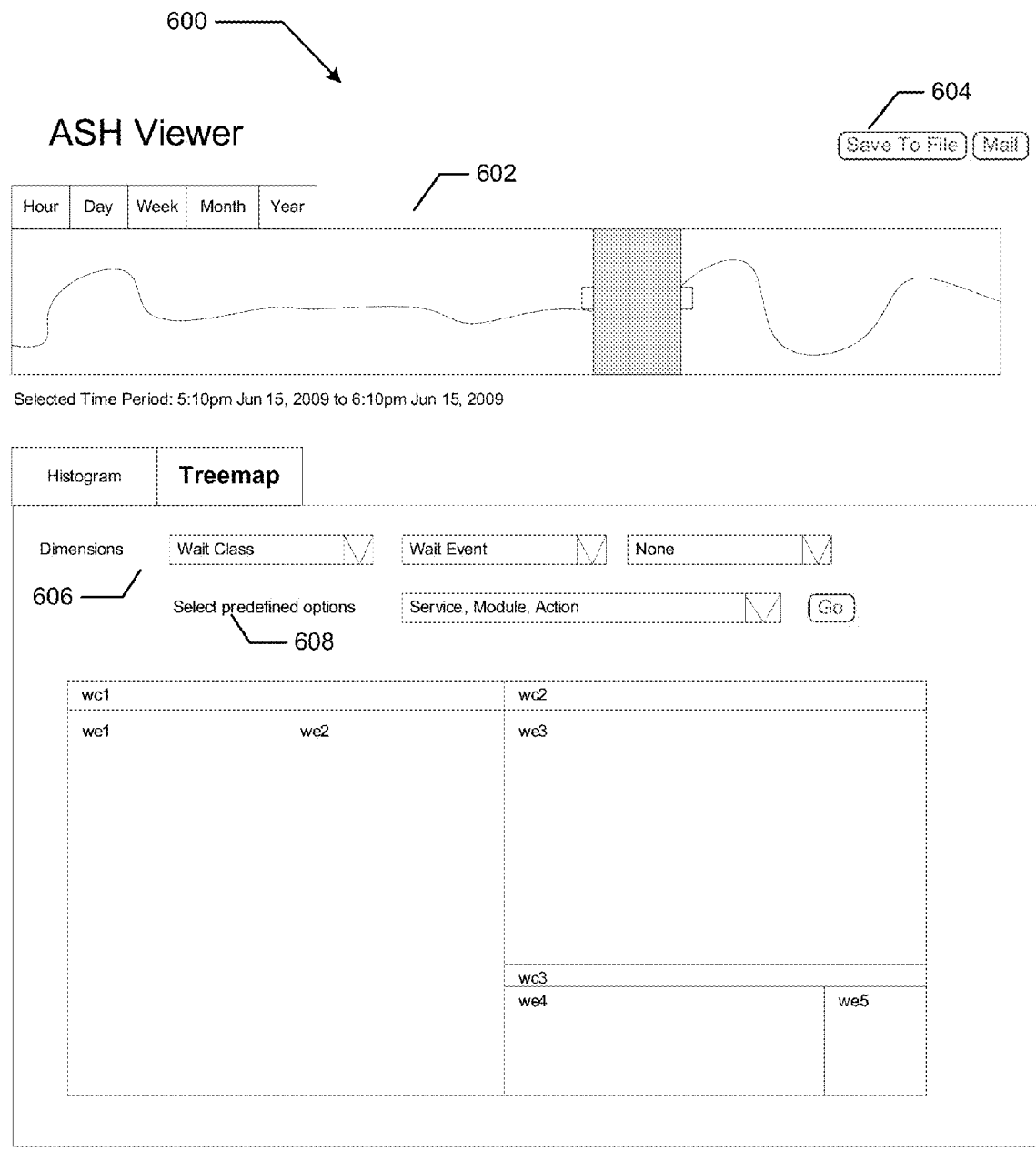
FIG. 6 is another example interface in accordance with one aspect of the present disclosure.

In another embodiment, the interface module may generate a treemap interface for visualizing and/or selecting ASH data and/or ASH data dimensions in the form of a treemap. The methodology for implementing a treemap is known in the art and a person of ordinary skill will appreciate how a treemap may be implemented to present ASH data. FIG. 6 represents an illustrative example of a treemap interface 600 capable of displaying ASH data in a multidimensional view. The treemap interface 600 may include various components that function similarly to components included within the histogram interface 500, such as a time period selection component 602 (e.g., 502 of FIG. 5), a save component 604 (e.g., 504 of FIG. 5), a dimensions component 606 (e.g., 506 of FIG. 5), a filtering component (not shown) (e.g. 508 of FIG. 5), and an other interesting dimensions component (not shown) (e.g. 512 of FIG. 5).

The treemap interface may include a feature that allows users to select a combination of dimensions and subsequently save the combination for future viewing. The treemap interface may further include a dimensional groupings component 608 that displays predefined groupings of dimensions to users. For example, the predefined groupings may include an "Application Tuning" group (not shown) consisting of a grouping of the Service, Wait Class, and SQL ID dimensions described in Table 1 above. As another example, the predefined groupings may include a "Global Query Tuning" group (not shown) including a grouping of the QC_Instance, QC_sid, and SQL ID dimensions described in Table 1 above. Other groupings may also be included. A comprehensive description of the tree structure is described in U.S. Pat. No. 8,095,514 entitled: "Treemap Visualizations Of Database Time", which is incorporated in its entirety by reference herein.

Referring again to FIG. 3, a selection of at least one dimension is received (operation 308). In particular, an interaction module 214 may receive input indicating the selection of one dimension to be applied to the ASH data currently being displayed. For example, a user may interact with the client devices (108,110) to enter various mouse clicks and/or keystrokes as prompted by one or more interfaces transmitted by the interface module 216 to provide input indicating the user's desired dimension.

In response to a user selection, a visualization of the ASH data is displayed based on the selected dimension (operation 310). In particular, as shown in FIG. 2, the interaction module 214 may initiate the interface module 216 to generate an interface displaying the selected dimension and a quantitative depiction of the amount of DB time that corresponds to the selected dimension. More particularly, the visualization may include a calculation of a percentage of DB time spent in the database corresponding to the selected dimension.

For example, referring to FIG. 4, the active session history 400 includes three samples (t1 402, t2 404, t3 406). Each active session within t1 402 includes a wait class dimension 408. In particular, session 1 and 2 of t1 402 include a wait class dimension 408 value indicating that the wait class is of type concurrency. Session 3 of t1 402 includes a wait class dimension value indicating that the wait class if of the type User I/O. Session 1 of sample 2 at time t2 404 includes a wait class dimension value indicating that the wait class is of the type concurrency. As explained above, each session within a sample is equated to a pre-determined period of time. Thus, assuming the pre-determined period of time is one second, the entire DB time for the samples illustrated in FIG. 4 is equal to 4 seconds. Since the wait class dimension value of "concurrency" was identified in three of the four active sessions, and each active session represents one second, it can be calculated that the wait class of type concurrency is equal to 3 seconds of DB time, or consuming the equivalent 3 seconds of DB time. Stated differently, the wait class dimension, and in particular the wait class of type concurrency, is consuming or otherwise adding to database activity 75% of the time.

An illustrative example of various aspects of the present disclosure will now be provided. A user, such as a database administrator, may be interested in exploring activity in the database 104 during a specific time period. To locate such activity, the monitoring system 112 may generate one or more user interfaces, such as the histogram interface 500 of FIG. 5., with components such as the time period selection component 502 as a resizable slider, that allows user the user to select a time period, and then display a layered graph (e.g., Session Graph 510) based ASH data dimension (e.g., Wait Class) of active session data for the identified time period.

Based on the displayed user interfaces, the user can see that a "concurrency" wait class dimension 509 is the biggest consumer of DB time, and wants to drill down further. Upon selecting on the concurrency dimension in the filtering component 508, the monitoring system 112 generates and displays another layered graph (not shown) showing the top wait events inside the concurrency wait class. The graph visualizes or otherwise indicates that a particular type of concurrency wait event—shared pool latches—are the biggest consumer of DB time. Pool latches are serialization mechanism used to protect area of shared memory. In particular, such latches prevent two processes from simultaneously updating and potentially corrupting the same memory area.

Subsequent to determining that shared pool latches are consuming large amounts of DB time, the user may want to determine what requests and/or operations (sql, session, module, action, etc.) being performed on the database 104 require a concurrency wait event, and in particular, a shared latch pool event. Thus, the user may select and/or analyze various other interesting ASH data dimensions 512 in the form of small charts on top of the main graph, such as the "SQL_ID" dimension. In response, the user detects a skew in the SQL_ID dimension and clicks on it to display its activity in the graph (e.g., session graph 510) and finds that sql id XYZ is the top consumer. Thus, the user now understands that a particular sql XYZ is causing the execution of multiple shared pool latches, all of which are consuming a lot of DB time, resulting in database performance issues.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method comprising:
capturing, using at least one processor, according to a pre-defined time period, a plurality of samples of active session data, each sample of the plurality of samples corresponding to a respective interval of time having a length of the pre-defined time-period, at least one sample of the plurality of samples identifying a respective set of sessions within a database that are active during the respective interval of time;
generating, using the at least one processor, a stored record for the at least one sample, the stored record for the at least one sample segmenting attributes of the respective set of sessions into a plurality of dimensions, the stored record for the at least one sample associating a first session in the respective set of sessions with a first dimension value for a first dimension of the plurality of dimensions and a second session in the respective set of sessions with a second dimension value for the first dimension of the plurality of dimensions;
receiving a selection of the first dimension of the plurality of dimensions: and
generating analytic data that characterizes the first dimension of the plurality of dimensions based, at least in part, on an occurrence of the first dimension value and the second dimension value in the stored record for the at least one sample.

2. The method of claim 1, further comprising generating a user-interface including a first set of one or more selectable components for selecting at least one dimension of the plurality of dimensions and a second set of one or more selectable components for filtering aggregation results based on dimension values associated with the first dimension.

3. The method of claim 1, wherein the first dimension value corresponds to a first sub-dimension of the first dimension and the second dimension value corresponds to a second sub-dimension of the first dimension.

4. The method of claim 1, wherein the analytic data includes a graphical user-interface that includes one or more of a histogram or a treemap that compares different dimension values for the first dimension.

5. The method of claim 1, wherein generating the analytic data that characterizes the first dimension based, at least in part, on an occurrence of the first dimension value and the second dimension value in the stored record for the at least one sample comprises:
performing a first aggregation based, at least in part, on how many samples within a target timeframe include the first dimension value;
performing a second aggregation based, at least in part, on how many sample within the target timeframe include the second dimension value;
generating, within a visualization for the first dimension, a first display region that corresponds to the first dimension value and has a first size based, at least in part, on the first aggregation; and
generating, within the visualization for the first dimension, a second display region that corresponds to the second dimension value and has a second size based, at least in part, no the second aggregation.

6. The method of claim 1, wherein the stored record for the at least one sample associates the first session in the respective set of sessions with a third dimension value for a second dimension of the plurality of dimensions and the second session in the respective set of sessions with a fourth dimension value for the second dimension of the plurality of dimensions.

7. The method of claim 1, wherein the analytic data compares how much database time or resources are consumed by active sessions having the first dimension value with how much database time or resources are consumed by active sessions having the second dimension value.

8. The method of claim 1, further comprising storing a dimensional hierarchy for the plurality of dimensions, the dimensional hierarchy including a set of nodes and a set of edges; each node in the set of nodes corresponding to a respective dimension in the plurality of dimensions, each edge in the set of edges corresponding to a respective relationship between two dimensions in the dimensional hierarchy.

9. A system for providing information comprising:
a storage system;
at least one processor in operable communication with the storage system, the at least one processor to:
capture, according to a pre-defined time period, a plurality of samples of active session data, each sample of the plurality of samples corresponding to a respective interval of time having a length of the pre-defined time-period, at least one sample of the plurality of samples identifying a respective set of sessions within a database that are active during the respective interval of time;
generate a stored record for the at least one sample, the stored record for the at least one sample segmenting attributes of the respective set of sessions into a plurality of dimensions, the stored record for the at least one sample associating a first session in the respective set of sessions with a first dimension value for a first dimension of the plurality of dimensions and a second session in the respective set of sessions with a second dimension value for the first dimension of the plurality of dimensions;
receive a selection of the first dimension of the plurality of dimensions: and
generate analytic data that characterizes the first dimension of the plurality of dimensions based, at least in part, on an occurrence of the first dimension value and the second dimension value in the stored record for the at least one sample.

10. The system of claim 9, wherein the at least one processor is further configured to generate a user-interface including a first set of one or more selectable components for selecting at least one dimension of the plurality of dimensions and a second set of one or more selectable components for filtering aggregation results based on dimension values associated with the first dimension.

11. The system of claim 9, wherein the first dimension value corresponds to a first sub-dimension of the first dimension and the second dimension value corresponds to a second sub-dimension of the first dimension.

12. The system of claim 9, wherein the analytic data includes a graphical user-interface that includes one or more of a histogram or a treemap that compares different dimension values for the first dimension.

13. A non-transitory computer readable medium storing instructions executable by a processor, the instructions comprising:
instructions which, when executed by one or more hardware processors, cause capturing, according to a pre-defined time period, a plurality of samples of active session data, each sample of the plurality of samples corresponding to a respective interval of time having a length of the pre-defined time-period, at least one sample of the plurality of samples identifying a respective set of sessions within a database that are active during the respective interval of time;
instructions which, when executed by one or more hardware processors, cause generating, using the at least one processor, a stored record for the at least one sample, the stored record for the at least one sample segmenting attributes of the respective set of sessions into a plurality of dimensions, the stored record for the at least one sample associating a first session in the respective set of sessions with a first dimension value for a first dimension of the plurality of dimensions and a second session in the respective set of sessions with a second dimension value for the first dimension of the plurality of dimensions
instructions which, when executed by one or more hardware processors, cause receiving a selection of the first dimension of the plurality of dimensions: and
instructions which, when executed by one or more hardware processors, cause generating analytic data that characterizes the first dimension of the plurality of dimensions based, at least in part, on an occurrence of the first dimension value and the second dimension value in the stored record for the at least one sample.

14. The non-transitory computer readable medium of claim 13, the instructions further including instructions which, when executed by one or more hardware processors, cause generating a user-interface including a first set of one or more selectable components for selecting at least one dimension of the plurality of dimensions and a second set of one or more selectable components for filtering aggregation results based on dimension values associated with the first dimension.

15. The non-transitory computer readable medium of claim 13, wherein the first dimension value corresponds to a first sub-dimension of the first dimension and the second dimension value corresponds to a second sub-dimension of the first dimension.

16. The non-transitory computer readable medium of claim 13, wherein the analytic data includes a graphical user-interface that includes one or more of a histogram or a treemap that compares different dimension values for the first dimension.

17. The non-transitory computer readable medium of claim 13, wherein instructions for generating the analytic data that characterizes the first dimension based, at least in part, on an occurrence of the first dimension value and the second dimension value in the stored record for the at least one sample comprise instructions which, when executed by one or more hardware processors, cause:
- performing a first aggregation based, at least in part, on how many samples within a target timeframe include the first dimension value;
- performing a second aggregation based, at least in part, on how many sample within the target timeframe include the second dimension value;
- generating, within a visualization for the first dimension, a first display region that corresponds to the first dimension value and has a first size based, at least in part, on the first aggregation; and
- generating, within the visualization for the first dimension, a second display region that corresponds to the second dimension value and has a second size based, at least in part, no the second aggregation.

18. The non-transitory computer readable medium of claim 13, wherein the at least one sample associates the first session in the respective set of sessions with a third dimension value for a second dimension of the plurality of dimensions and the second session in the respective set of sessions with a fourth dimension value for the second dimension of the plurality of dimensions.

19. The non-transitory computer readable medium of claim 13, wherein the analytic data compares how much database time or resources are consumed by active sessions having the first dimension value with how much database time or resources are consumed by active sessions having the second dimension value.

20. The non-transitory computer readable medium of claim 13, further comprising storing a dimensional hierarchy for the plurality of dimensions, the dimensional hierarchy including a set of nodes and a set of edges; each node in the set of nodes corresponding to a respective dimension in the plurality of dimensions, each edge in the set of edges corresponding to a respective relationship between two dimensions in the dimensional hierarchy.

* * * * *